(12) United States Patent
Faerber et al.

(10) Patent No.: US 9,078,160 B2
(45) Date of Patent: Jul. 7, 2015

(54) APPARATUS, METHOD AND PROGRAM FOR DETECTING COVERAGE HOLES AND PROVIDING A CONFIDENCE ESTIMATION VALUE OF DETECTED COVERAGE HOLES TO DECIDE ON A COVERAGE HOLES REDUCING ACTION (75) Inventors: Michael Faerber, Wolfratshausen (DE); Juergen Michel, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 458 days.

(21) Appl. No.: 13/123,298

(22) PCT Filed: Oct. 10, 2008

(86) PCT No.: PCT/EP2008/063650
§ 371 (c)(1),
(2), (4) Date: Apr. 8, 2011

(87) PCT Pub. No.: WO2010/040417
PCT Pub. Date: Apr. 15, 2010

(65) Prior Publication Data
US 2011/0195707 A1    Aug. 11, 2011

(51) Int. Cl.
*H04W 24/00*    (2009.01)
*H04W 24/08*    (2009.01)
*H04W 16/18*    (2009.01)
*H04W 24/02*    (2009.01)

(52) U.S. Cl.
CPC .............. *H04W 24/08* (2013.01); *H04W 16/18* (2013.01); *H04W 24/02* (2013.01)

(58) Field of Classification Search
CPC ...... H04W 16/18; H04W 24/02; H04W 24/08
USPC ............. 455/423–425, 445–447, 67.11, 67.3, 455/67.13, 67.14, 456.1, 456.3, 457, 67.1, 455/439, 456.5; 370/328–332, 338, 249
See application file for complete search history.

(56) References Cited

U.S. PATENT DOCUMENTS

| 2006/0128371 A1* | 6/2006 | Dillon et al. ................... 455/423 |
| 2006/0205402 A1* | 9/2006 | Banavar et al. ............ 455/426.1 |
| 2007/0243881 A1 | 10/2007 | Roskowski ................ 455/456.1 |

FOREIGN PATENT DOCUMENTS

| WO | WO 2006/063309 A2 | 6/2006 |
| WO | WO 2008/016799 A2 | 2/2008 |

OTHER PUBLICATIONS

Scully, N., et. al., "Use Cases for Self-Organising Networks", Mar. 31, 2008, 71 pgs.

* cited by examiner

*Primary Examiner* — Babar Sarwar
(74) *Attorney, Agent, or Firm* — Harrington & Smith (57) ABSTRACT

Method, apparatus and software configured to detecting a radio coverage hole and providing a confidence information of a detected radio coverage hole. A coverage hole detection signal and confidence information may be received and evaluated, deciding on a potential coverage hole reducing or closing process depending on the evaluation.

41 Claims, 5 Drawing Sheets

APPARATUS, METHOD AND PROGRAM FOR DETECTING COVERAGE HOLES AND PROVIDING A CONFIDENCE ESTIMATION VALUE OF DETECTED COVERAGE HOLES TO DECIDE ON A COVERAGE HOLES REDUCING ACTION

FIELD AND BACKGROUND

Embodiments of the invention generally relate to one or more of networks, communication, network elements, methods, apparatuses, systems, radio systems, radio access networks, and programs e.g. for coverage hole detection or hole related processing or operation.

Embodiments of the invention may relate to mobile wireless communications, such as third generation partnership project, 3GPP, long-term evolution (LTE & LTE-A) or any other existing technologies.

Some radio access systems facilitate variable bandwidth support, e.g. on orthogonal frequency division multiplex access, OFDMA, and orthogonal frequency division multiple, OFDM, access air interface concepts. Examples include long-term evolution, LTE, and worldwide interoperability for microwave access, WiMAX, etc.

In some networks, the access apparatus like radio access devices such as NodeBs, NBs, and also home NodeBs or evolved home NodeBs, H(e)NBs, base stations, may be continuously operated. A base station, base transceiver station, or NodeB may have remarkable power consumption when active, and may generate significant operational expenditure due to its power consumption. In addition to the cost aspect for the operator, the ecological impact has to be considered.

At least some radio access systems aim at reducing power consumption of a base station or other access systems like radio systems for operational expenditure, OPEX, and ecological reasons, by means of e.g. temporarily switching off dedicated base stations, BSs, or base transceiver stations, BTSs, and re-configuring other base stations autonomously, to retain the coverage.

A mobile station may be configured to notify a state when it is out of suitable coverage. This may be a state when the mobile station is unable to detect e.g. a broadcast signal with sufficient reception performance. When the mobile station gets back into a state of sufficient radio coverage, the terminal may send a report such as a "coverage hole detected" message to the network. The report receiving entity or the network may in turn deliver this report to an operation and maintenance, O&M, system. At least one of the network and the operation and maintenance system may have means to correct such possible coverage holes, especially if self-configuring and/or self-optimizing network, SON, procedures intentionally have turned off base stations or sectors. The network or operation and maintenance, O&M system, or another entity may then decide based on the report whether or not such an action like switching on again a base station or sector or other type of coverage hole closing or reducing action is justified.

However, a radio coverage loss may not always be caused by a coverage hole, as e.g. caused by a SON measure. There may be random accidental losses, like a mobile was misplaced in an out-of-coverage area such as a closed environment like a garage for a while. Or the terminal may have entered a sub-terrain car park, a subway station, or an elevator, i.e. areas which are part of a calculated outage of the network operators network planning.

SUMMARY

In accordance with at least one or all of the embodiments, an improved SON behavior is provided. In accordance with one or more embodiments of the invention, at least one of a coverage hole detection confidence estimation and an estimation signaling is implemented.

Embodiments of the invention provide a procedure which may allow terminals to report coverage holes, e.g. after re-acquisition of coverage, combined with a confidence information or confidence value. Herewith, useless measures by the network can be avoided.

Embodiments of the invention may relate to mobile wireless communications, such as 3GPP long-term evolution (LTE & LTE-A) and may relate more specifically to system behaviour in SON enabled networks, supporting automated configuration and energy optimization which may be an aspect in existing and future wireless systems. The described principles and embodiments may also be used in existing technologies other than LTE. The parameters and procedures in accordance with one or more embodiments of the invention may be adapted to existing technology, interfaces and architecture.

In accordance with one or more embodiments of the invention, an apparatus is configured to detect a radio coverage hole and to provide a confidence information of a detected radio coverage hole.

In accordance with one or more embodiments of the invention, the apparatus may be configured to report at least one detected radio coverage hole, optionally together with the confidence information, after re-acquisition of a connection to an access network.

In accordance with one or more embodiments of the invention, an apparatus may comprise at least one or more of:
  the apparatus is configured to additionally report at least one of:
  an identity of a last cell to which it was attached,
  a location of the apparatus,
  a time stamp,
  at least one confidence value for one or more other parameters,
  the apparatus is configured to send at least one confidence information such as a confidence estimation value after a radio link failure, or after a handover event, such as after a handover from a non-preferred network or frequency to a preferred network or preferred frequency in a case the non-preferred network or frequency was chosen due to the fact that no cell, network or frequency of the preferred type had been available,
  the apparatus is configured to send one or more indications of conditions to a network.

In accordance with one or more embodiments of the invention, an apparatus may comprise at least one or more of, in any arbitrary combination:
  the apparatus is configured to receive a confidence threshold from another apparatus or an access network,
  the apparatus is configured to store a received or preset confidence threshold,
  the apparatus is configured to compare the confidence information with the received or stored confidence threshold, and
  the apparatus is configured to decide on reporting or not reporting a detected radio coverage hole depending on the comparison result,
  the apparatus is configured to receive a confidence reporting threshold and/or one or more confidence-improving factors,
  a confidence improving factor or parameter indicating knowledge how far self-organizing network, SON, procedures are activated, a confidence improving factor or parameter indicating that cells, and optionally also indicating which cells, are disabled by a self-organizing network, SON, measure.

In accordance with one or more embodiments of the invention, an apparatus may comprise at least one or more of, in any arbitrary combination:
deciding on the confidence information based on:
if the mobile station had beside the serving cell, at least one or more also acceptable cells, and within a short time period, all of the serving cell and acceptable cells are disappearing, such a situation is evaluated as a zero or low confidence information;
the confidence information being determined based on one or more, in any arbitrary combination, of the following or other parameters:
has a network indicator indicating or self-organizing network been received;
was the serving cell lost;
was there a handover from a non-preferred network or frequency which had been chosen earlier due to the fact that no cells of the preferred type were available;
has one or more suitable neighbour cells disappeared in close timing relationship with the disappearance of the serving cell;
has a closed subscription groups, CSG, network or a radio access such as a base station like a home NodeB or evolved home NodeB, HeNB, appeared/disappeared;
is the user equipment registered to a closed subscription groups network;
has user equipment position information such as global positioning system, GPS, data available or other location data provided by other means,
the confidence information is set dependent on downlink transmission power of a cell,
the confidence information is set dependent on whether or not position information of the apparatus is available.

In accordance with one or more embodiments of the invention, an apparatus may comprise:
at least one of the confidence information and a confidence threshold are defined to be a real value of a certain range,
if the confidence threshold is set to, or received having, a specific value, the apparatus is configured to carry out no coverage related measurements,
if no confidence threshold is received, coverage hole related measurements are switched off.

In accordance with one or more embodiments of the invention, the apparatus may be at least one of a terminal, mobile station, user equipment, a part of a terminal, a part of a mobile station, a part of a user equipment, a module, a chipset, a circuitry, or a software product.

In accordance with one or more embodiments of the invention, an apparatus may be configured to:
receive a coverage hole detection signal,
evaluate a received confidence information, and
decide on a potential coverage hole reducing or closing process depending on the evaluation, the process optionally comprising a switching-on of a switched-off base station, or increasing a transmit power level or changing a coverage area of one or more active base stations.

In accordance with one or more embodiments of the invention, an apparatus may be configured to at least one or more of:
determine whether a coverage hole is present and/or remedy measures are to be taken, based on at least one criterion such as heuristics, a number of users providing a coverage hole report in a similar location,
send a confidence reporting threshold and/or one or more confidence-improving factors,
a confidence improving factor or parameter indicating knowledge how far self-organizing network, SON, procedures are activated,
a confidence improving factor or parameter indicating that cells, and optionally also indicating which cells, are disabled by a self-organizing network, SON, measure.

In accordance with one or more embodiments of the invention, the apparatus may e.g. be a controller or part of a controller, a network, a module, a chipset, a circuitry, or a software product.

In accordance with one or more embodiments of the invention, a system may comprise at least one or more apparatuses as defined above or below.

In accordance with one or more embodiments of the invention, a method may comprise detecting a radio coverage hole and providing a confidence information of a detected radio coverage hole.

In accordance with one or more embodiments of the invention a method may comprise reporting at least one detected radio coverage hole, optionally together with the confidence information, after re-acquisition of a connection to an access network.

In accordance with one or more embodiments of the invention, a method may comprise at least one or more, in any arbitrary combination, of the following:
additionally report at least one of:
an identity of a last cell to which it was attached,
a location of the apparatus,
a time stamp,
at least one confidence value for one or more other parameters,
sending at least one confidence information such as a confidence estimation value after a radio link failure, or after a handover event, such as after a handover from a non-preferred network or frequency to a preferred network or preferred frequency in a case the non-preferred network or frequency was chosen due to the fact that no cell, network or frequency of the preferred type had been available,
sending one or more indications of conditions to a network,
receiving a confidence threshold from another apparatus or an access network,
storing a received or preset confidence threshold,
comparing the confidence information with the received or stored confidence threshold, and
deciding on reporting or not reporting a detected radio coverage hole depending on the comparison result,
receiving a confidence reporting threshold and/or one or more confidence-improving factors,
a confidence improving factor or parameter indicating knowledge how far self-organizing network, SON, procedures are activated,
a confidence improving factor or parameter indicating that cells, and optionally also indicating which cells, are disabled by a self-organizing network, SON, measure,
deciding on the confidence information based on:
if the mobile station had beside the serving cell, at least one or more also acceptable cells, and within a short time period, all of the serving cell and acceptable cells are disappearing, evaluating such a situation as a zero or low confidence information;
determining the confidence information based on one or more, in any arbitrary combination, of the following or other parameters:

has a network indicator indicating 0 self-organizing network been received;

was the serving cell lost;

was there a handover from a non-preferred network or frequency which had been chosen earlier due to the fact that no cells of the preferred type were available;

has one or more suitable neighbour cells disappeared in close timing relationship with the disappearance of the serving cell;

has a closed subscription groups, CSG, network or a radio access such as a base station like a home NodeB or evolved home NodeB, HeNB, appeared/disappeared;

is the user equipment registered to a closed subscription groups network;

has user equipment position information such as global positioning system, GPS, data available or other location data provided by other means, the confidence information is set dependent on downlink transmission power of a cell, the confidence information is set dependent on whether or not position information of the apparatus is available.

In accordance with one or more embodiments of the invention a method may comprise:

at least one of the confidence information and a confidence threshold are defined to be a real value of a certain range, if the confidence threshold is set to, or received having, a specific value, no coverage related measurements are carried out, if no confidence threshold is received, coverage hole related measurements are switched off.

The method may e.g. be carried out in at least one of a terminal, mobile station, user equipment, a part of a terminal, a part of a mobile station, a part of a user equipment, a module, a chipset, a circuitry, or a software product.

In accordance with one or more embodiments of the invention a method may comprise receiving a coverage hole detection signal, evaluating a received confidence information, and deciding on a potential coverage hole reducing or closing process depending on the evaluation, the process optionally comprising a switching-on of a switched-off base station, or increasing a transmit power level or changing a coverage area of one or more active base stations.

In accordance with one or more embodiments of the invention a method may comprise at least one or more of:

determining whether a coverage hole is present and/or remedy measures are to be taken, based on at least one criterion such as heuristics, a number of users providing a coverage hole report in a similar location, sending a confidence reporting threshold and/or one or more confidence-improving factors, a confidence improving factor or parameter indicating knowledge how far self-organizing network, SON, procedures are activated, a confidence improving factor or parameter indicating that cells, and optionally also indicating which cells, are disabled by a self-organizing network, SON, measure.

In accordance with one or more embodiments of the invention the method may be carried out in a controller or part of a controller, a network, a module, a chipset, a circuitry, or a software product.

In accordance with one or more embodiments of the invention a computer program product may comprise code means configured to carry out or implement, when run on a processor, a method or a part of a method or functions as mentioned above or below.

In accordance with one or more embodiments of the invention the computer program product may e.g. be embodied on a computer-readable medium.

A network may comprise such an apparatus as mentioned above or in the following text. The network may comprise an evolved packet service, EPS architecture, or may comprise at least one of a serving general packet radio service support node, SGSN, a mobility management entity, MME, or a gateway are provided.

In accordance with one or more of the embodiments of the invention, a computer program product is provided which comprise code means configured to carry out or implement, when run on a processor, The computer program product may e.g. be embodied on a computer-readable medium.

Other objects, features and advantages of the embodiments of the invention will become apparent from the following description of embodiments of the invention.

DESCRIPTION OF EMBODIMENTS

In this description, a coverage hole may e.g. be understood as a situation in which a mobile or stationary terminal does not have (any, or only insufficient or too weak) radio access to a radio access network or mobile radio or mobile network for sending or receiving radio signals. Usually, in such cases the radio signals are received, if at all, by the terminal or the access network with zero power or such low power that they cannot be successfully decoded.

E.g. a terminal such as a mobile station or user equipment or fixedly installed equipment, may search for any broadcast channel, BCH, signal or other broadcast information indicating radio connection with a base station or NodeB etc. A mobile station in a coverage hole may be unable to detect a broadcast channel, BCH, from a single cell. When detecting a coverage hole, a user equipment may send an uplink, UL, signal at once, e.g. using its maximum power or a coded signal, formatted in time, code and frequency domain in such a way that the signal may be received over a wider range, compared to the usual terminal UL signals for user data transmission, or may send such a signal when again having suitable radio access.

In accordance with one, more or all of the embodiments of the invention, a terminal may determine if a lack of access is e.g. caused by a coverage hole by disabled base stations or by a hole as such, and may calculate a confidence value or confidence information of such a coverage hole detection. The term confidence value, as used in the present specification and claims, is intended to include or comprise and cover any type of a confidence value such as a numerical value, binary sequence, class indication, etc., and any confidence information of any other type.

A terminal may send a coverage hole detection signal, e.g. a narrowband signal, e.g. on a random access channel, RACH, or other channel, etc.

Figure 1:
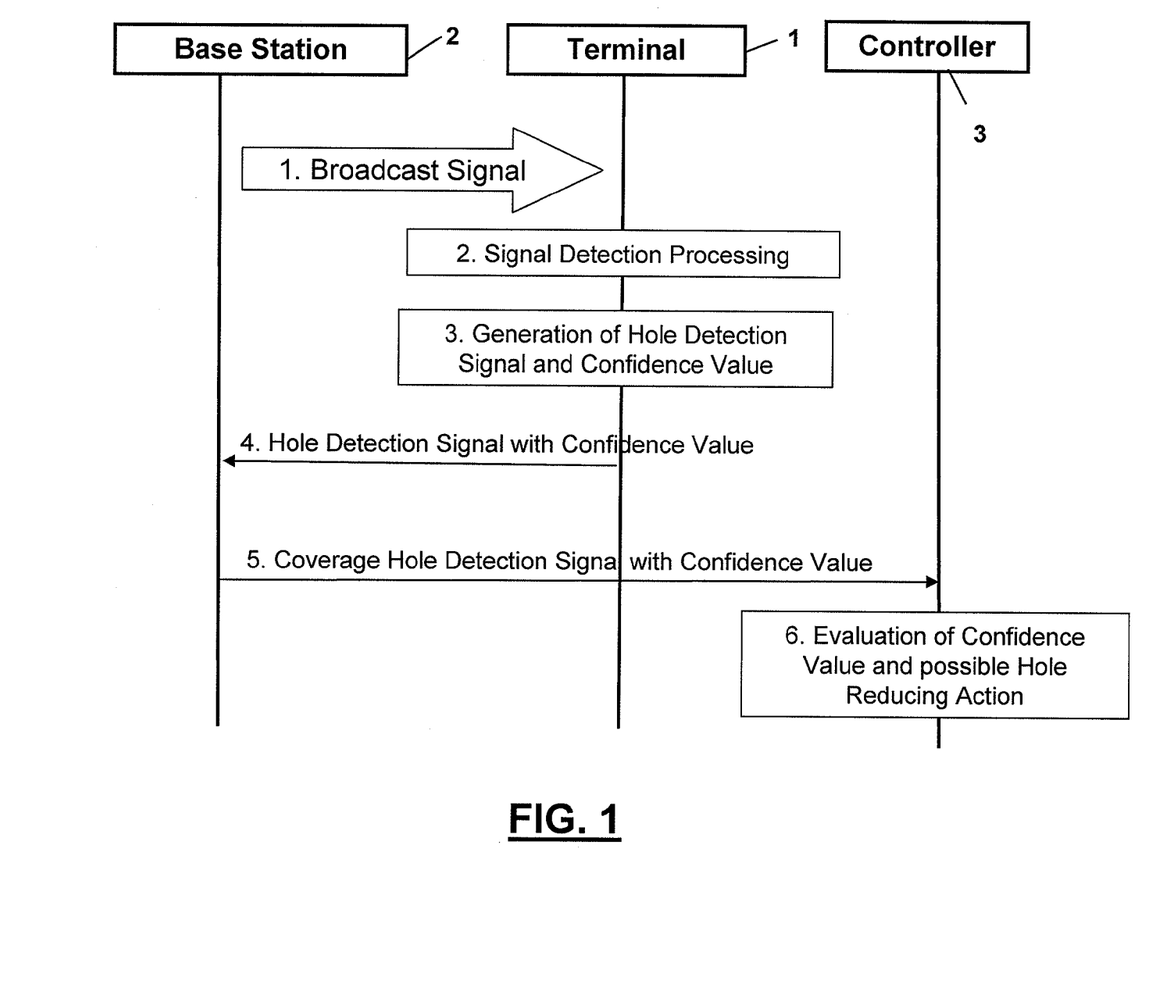
FIG. 1 illustrates an embodiment of a system and apparatuses in accordance with the invention.

FIG. 1 illustrates an embodiment of a system and method, and embodiments of apparatuses in accordance with the invention. FIG. 1 shows an implementation in accordance with one, more or all of the embodiments of the invention which involves at least one of the shown components such as at least one terminal 1, one or more base stations 2, and a controller 3.

As shown in the embodiment of FIG. 1, at least one or more of the base stations 2 may send or broadcasting a signal such as a broadcast or beacon signal, as indicated by arrow 1. In case the terminal 1 does not receive or is unable to receive the signal of arrow 1, or is unable to decode a normal signal such as a received BCH signal, or also in other or different cases, the terminal 1 optionally performs (step 2) a signal detection processing for possibly better detecting the presence or lack of such signals as indicated by the arrow 1.

In a step 3, when detecting no or only a too weak signal, the terminal 1 decides on coverage hole and generates, in step 3, a hole detection signal and a confidence value indicating the reliability of the coverage hole detection. The terminal 1 may send the coverage hole detection signal and/or the confidence value signal or signals generated in step 3 to the base station 2 in step 4 for informing one or more of the base stations 2 on the fact of a presumable coverage hole or on the very bad or missing reception due to e.g. a coverage hole.

This hole detection signal with confidence value may be sent, in step 4, on the uplink channel and will be received by one or more of the base stations 2.

The base station 2 may react to the received hole detection signal of step 4 by sending, in step 5, a coverage hole detection signal, optionally together with the confidence value, to the controller 3 such as a radio network controller, an access controller, a NodeB, an operational and maintenance centre, or other device.

The controller 3 may react to the coverage hole detection signal of step 5 by initiating an evaluation of the confidence value for deciding on a potential coverage hole reducing or closing process 6 such as switching on a switched off base station, and/or increasing the transmit power level, and/or changing the coverage area of one or more active base stations, etc.

Generally, self-configuring and/or self-optimizing network, SON, procedures allow a temporary disabling of one or more sectors or entire base stations 2. Various methods may be considered for re-activating a station in an out of coverage scenario. If a NodeB or base station 2 should be turned off, manual procedures, or operation and maintenance configuration may be provided. Reactivation may be provided by using a specially formed uplink, UL, signal, enhancing the range capabilities of the terminal. A specific receiver may be provided in the active base stations to detect such a specially formed signal. A random access channel procedure may be used to wake-up a sleeping NodeB base station or base stations such as LTE NBs.

Another procedure is to wait until the terminal 1 such as a mobile station has re-acquired coverage and then sends a report. When a terminal 1 has lost its radio connection with its base station 2 (e.g. downlink radio link failure), and regains its connection with the same base station or a different base station, it may send a failure report. The terminal may also report its current location, or the base station may request the terminal to report its current location, or may obtain the current location of the terminal using other means, like a positioning system. After receiving such failure report, the base station 2 may forward the report to the controller 3 such as an O&M controller. Based on at least one criterion such as heuristics (e.g., a number of users providing a coverage hole report in the similar location), the controller, e.g. a central controller may determine if a coverage hole is present and/or remedy measures should be taken.

Generally, such radio coverage loss may not always be caused by a coverage hole, as e.g. due to a SON measure. There may be random accidental losses, like a mobile was misplaced in an out-of-coverage area such as a closed environment like a garage for a while. Or the terminal may have entered a sub-terrain car park, a subway station, or an elevator, i.e. areas which are part of a calculated outage of the network operators network planning. Such events lead to a low confidence value attributed to a coverage hole signal.

In addition, or in another embodiment procedure or device of the invention, the network or a controller such as a network controller may set a confidence threshold. At least one, more or all terminals 1 such as user equipments are informed by the network or network controller on the set confidence threshold. The user equipments may derive a confidence value of a coverage hole detection, and may compare the derived confidence value with the threshold. In one or more embodiments, only if the confidence value derived at the terminal or user equipment, UE, is higher than the confidence threshold set by the network, the user equipment reports the coverage hole related measurement to the network such as to a base station, NodeB, network controller, radio network controller or the like.

Figure 2:
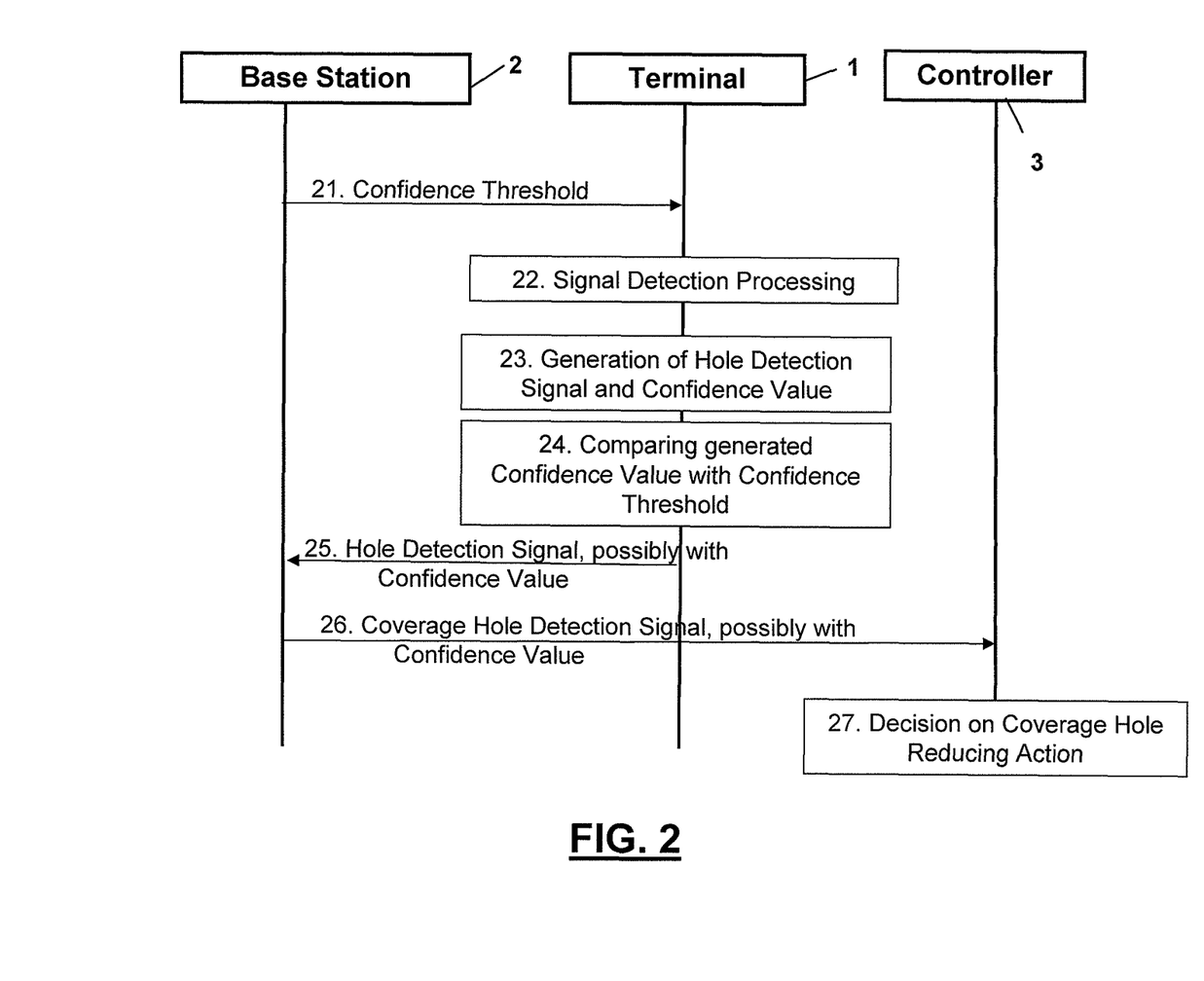
FIG. 2 shows an embodiment configured in accordance with another implementation of the invention.

FIG. 2 illustrates a further embodiment of a system and method, and embodiments of apparatuses in accordance with the invention. FIG. 2 shows an implementation in accordance with one or more embodiments of the invention which involves at least one of the shown components such as at least one terminal 1, one or more base stations 2, and a controller 3.

In the embodiment of FIG. 2, at least one or more of the base stations 2 may send or broadcast a broadcast or beacon signal, as described above with reference to FIG. 1. Further, the base station 2 or controller 3 sends an information or message 21 comprising a confidence threshold calculated or set by the base station 2 or the controller 3 or another apparatus of the network. The term confidence threshold, or confidence threshold value, as used in the present specification or claims, is intended to include or comprise and cover any type of a confidence threshold such as a numerical value, binary sequence, class indication, etc. and any confidence threshold information of any other type. The terminal 1 receives the confidence threshold value of message 21, and may store the received confidence threshold value in an internal memory.

In case the terminal 2 does not receive, or is unable to receive, the broadcast signal, or decode a normal signal such as a received broadcast channel, BCH, signal, or also in other or different cases, the terminal 1 may optionally perform (step 22) a signal detection processing for better detecting the presence of broadcast signals such as indicated by the arrow 1 in FIG. 1.

In a step 23, when detecting no or only a too weak signal, e.g. radio signal, the terminal 1 decides on existence of a coverage hole and generates, in step 23, a hole detection signal and a confidence value indicating the reliability of hole detection. In a step 24, the terminal 1 compares the calculated or derived confidence value with the confidence threshold received in message 21.

When the calculated or derived confidence value is lower than the confidence threshold received in message 21, the terminal does not send a hole detection signal to the base station 2.

Otherwise, when the calculated or derived confidence value is equal to or higher than the confidence threshold received in message 21, the terminal sends, in step 25, a hole detection signal to the base station 2, for informing the at least one base station 2 or the network on the very bad or missing reception due to e.g. a coverage hole. The message 25 may optionally comprise the confidence value calculated or derived by the terminal 1 so as to better inform the base station or network on the reliability of the hole detection result.

This hole detection signal with confidence value may be sent, in step 25, on the uplink channel to the base station 2.

Upon receipt of hole detection signal of step 25, the base station 2 may send, in step 26, a coverage hole detection signal, optionally together with the confidence value, to the controller 3 such as a radio network controller, a NodeB, an operational and maintenance centre, or other device.

The controller 3 may react to the coverage hole detection signal of step 26 by initiating an evaluation of the confidence value for deciding on a potential coverage hole reducing or closing process 27 such as switching on a switched off base station, or increasing the transmit power level or changing the coverage area of one or more active base stations, etc.

Figure 3:
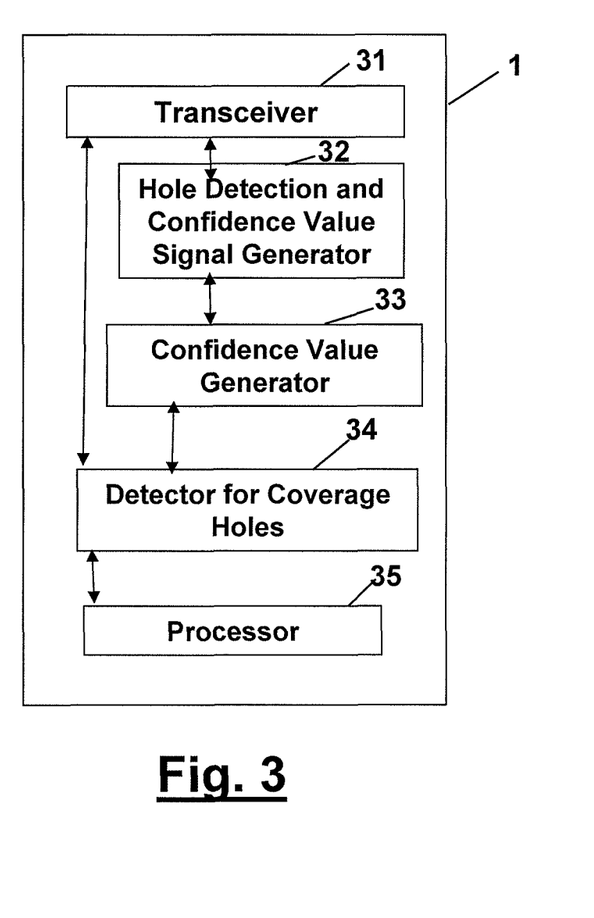
FIG. 3 illustrates another embodiment of the invention.

FIG. 3 illustrates an embodiment of a terminal 1 in accordance with the invention. The terminal 1 comprises a transceiver 31 for transmitting and receiving signals to and from e.g. a base station, a coverage hole detection and confidence value signal generator 32 for generating a coverage hole detection signal and/or a confidence value signal when a coverage hole is detected, a confidence value generator 33 for evaluating the reliability of a detected coverage hole, a detector 34 for detecting a coverage hole e.g. in the manner as described above or below, and a processor 35 for signal processing and/or controlling one or more of the components of FIG. 3 or of the terminal 1.

Figure 4:
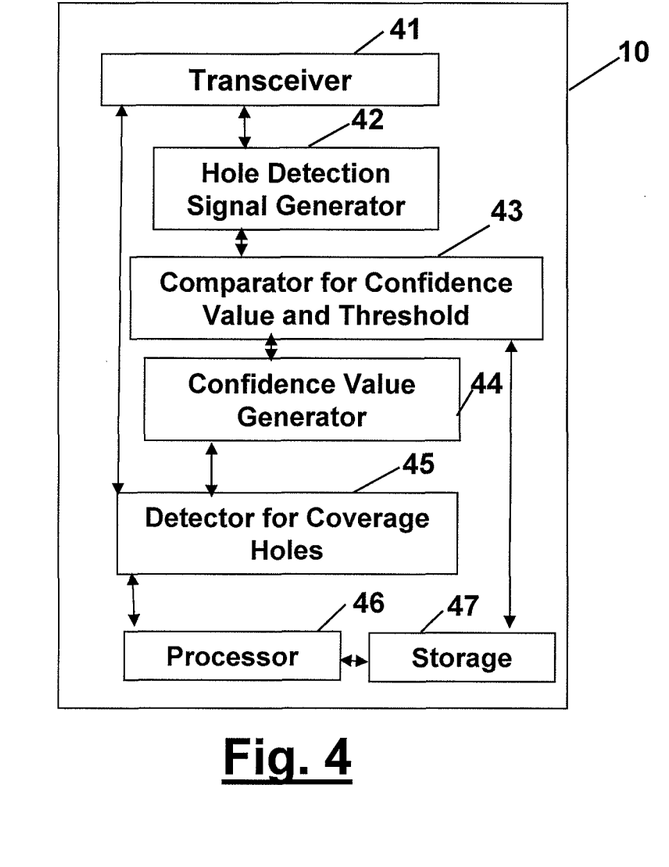
FIG. 4 shows a further embodiment of the invention.

FIG. 4 illustrates another embodiment of a terminal 10 in accordance with the invention. The terminal 10 comprises a transceiver 41 for transmitting and receiving signals to and from e.g. a base station, a coverage hole detection signal generator 42 for generating a coverage hole detection signal when a coverage hole is detected, a comparator 43 for comparing the calculated or derived confidence value of a coverage hole detection result with a confidence threshold, a confidence value generator 44, a detector 45 for detecting a coverage hole e.g. in the manner as described above or below, a processor 46 for signal processing and/or controlling one or more of the components of FIG. 4 or of the terminal 10, and a storage 47 for storing a confidence threshold received from the network or a preset confidence value.

Figure 5:
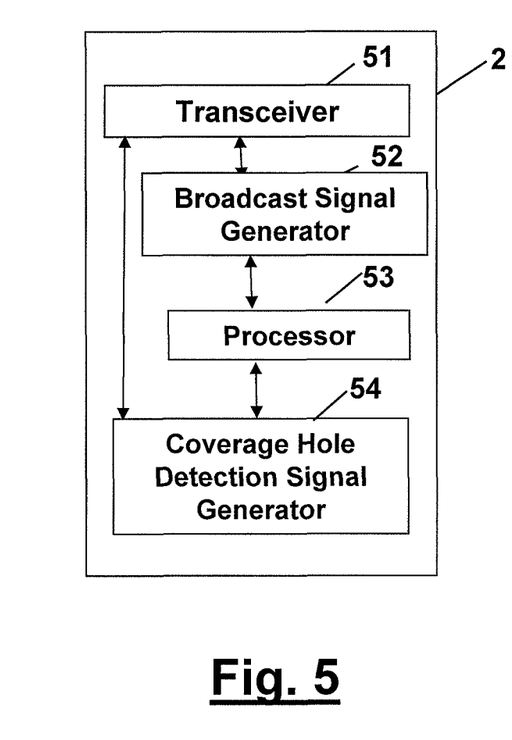
FIG. 5 shows a structure of an example of a base station in accordance with an embodiment of the invention.

FIG. 5 shows a structure of an example of the base station 2 in accordance with an embodiment of the invention. The base station 2 comprises a transceiver 51 for transmitting and receiving signals to and from e.g. the terminal 1, a signal generator 52 for generating a broadcast signal such as a broadcast channel signal or a beacon signal, e.g. as described above or below, a processor 53 for signal processing and/or controlling one or more of the components of FIG. 5 or of the base station 2, and a coverage hole detection signal detector 54 for detecting or recognizing a coverage hole detection signal received e.g. from terminal 1.

Figure 6:
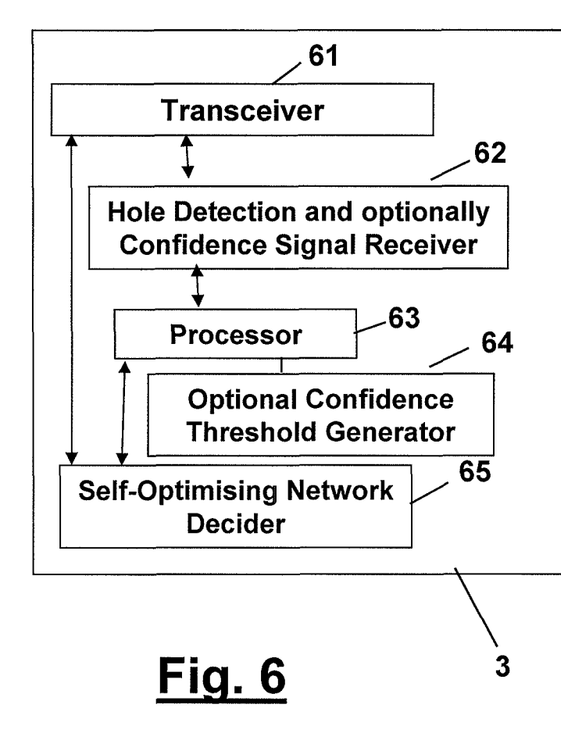
FIG. 6 shows a structure of an example of a controller in accordance with an embodiment of the invention.

FIG. 6 shows a structure of an example of the controller 3 in accordance with an embodiment of the invention. The controller 3 comprises a transceiver 61 for transmitting and receiving signals to and from e.g. the network, e.g. access network such as a radio access network, a coverage hole detection signal, and optionally confidence value, receiver 62, a processor 63 for signal processing and/or controlling one or more of the components of FIG. 6 or of the controller 3, an optional confidence threshold generator 64 for generating a confidence threshold for one or more of the terminals, and a self-optimising network, SON, decider 65 for deciding on SON actions such as switching on or off one or more base stations etc.

In accordance with one, more or all of the embodiments of the invention, a time domain coordination can be used to send or receive uplink coverage hole detection signals on different times. Further, algorithms can be introduced, in accordance with one, more or all of the embodiments of the invention, to avoid collisions from coverage hole detection signals of multiple terminals.

In accordance with one, more or all of the embodiments of the invention, a condition can be created allowing the terminal to identify a coverage hole situation as such, e.g. identifying a hole as being caused by a turned off base station.

The terminal 1 may be configured to send an uplink coverage hole detection signal to initiate re-configuration, e.g. in specific time slots. The signals, functions or devices can be fully embedded in existing structures. No extra receiver on specific bands is necessary.

One, more or all of the embodiments of the invention relate to at least one of one or more self organizing networks or apparatus, power saving, coverage reliability.

In accordance with at least one or more or all of the embodiments of the invention, the network or one or more apparatuses such as the controller or radio network controller 3 can turn off one or more sectors and/or entire base stations e.g. of a network, and optionally may have an apparatus or means to detect areas of insufficient coverage.

Self organizing procedures or sub-routines may be located in one or more or all base stations, and may react to one or more detected coverage holes by initiating re-configurations by an apparatus such as an operation and management, O&M, center to minimize coverage holes, or by initiating putting a disabled base station back into operation.

A terminal may send an uplink, UL, signal using high or even up to its maximum terminal transmission power when detecting a coverage hole which can be received over a wider range. This uplink signal can be sent, in one or more embodiments, without specific information content (beside of being present or not), or with little information content.

In accordance with one, more or all of the embodiments of the invention, a cell or base station with low or no traffic, may be turned off by an apparatus such as a software, SW, agent. The turning off apparatus or agent may in turn inform one or more or all of the adjacent cells about this activity of switching off of the cell, and may also inform the operational and maintenance, O&M center.

As an alternative to sending a narrowband signal, the coverage hole detection signal sent by a terminal when detecting a coverage hole may be a code spreaded signal which may be spreaded over the entire system bandwidth, or may have any other suitable form.

In accordance with one or more embodiments of the invention, a mobile station such as terminal 1 comprises means to report out of coverage events with a confidence information such as a confidence factor. The mobile station may additionally report at least one of an identity of the last cell to which it was attached, last cell id, optionally its location if possible, a time stamp and other easy to acquire information. According to this or other embodiments, at least one confidence value is introduced, and/or one or more individual confidence values for one or more parameters.

Confidence information may be sent after radio link failures, or after handover events from non-preferred networks (or frequencies) to a preferred network or preferred frequency in case the non-preferred network/frequency was chosen due to the fact that no cells of the preferred type were available.

Optionally a confidence reporting threshold and/or confidence improving factors may be sent from the network to the base station 2 or the terminal 1. For example, a confidence improving factor or parameter is or indicates knowledge how far self-organizing network, SON, procedures are activated. The network may indicate in broadcast information, e.g. on the broadcast channel, BCH, that cells, and possibly also indicating which cells, are disabled by a SON measure.

A confidence value or confidence improving factor can be determined based on the serving cell and neighbour cell measurements history. If the serving cell is lost, and no other suitable cells had been visible for a while, the confidence (value or factor) of a coverage hole is high.

If the mobile station had beside the serving cell, at least one or more also acceptable cells, and within a very short period, all of them are disappearing, such a situation is showing a high probability or confidence that the terminal was suddenly entering a badly covered area, like a sub terrain car park. Such a situation will be categorized as a coverage hole of low or zero confidence value.

The confidence value or factor may be comprised out of one or more, in any arbitrary combination, of the following or other parameters:

*) optionally whether a SON indicator was received; however, embodiments of the method and devices may also work without broadcasting of such information;

*) was the serving cell lost;

*) was there a handover from a non-preferred network or frequency which had been chosen earlier due to the fact that no cells of the preferred type were available;

*) has one or more suitable neighbour cells disappeared in close timing relationship with the disappearance of the serving cell;

*) has a closed subscription groups, CSG, network or a radio access such as a base station like a home nodeB or evolved home nodeB, HeNB, appeared/disappeared;

*) is the user equipment registered to a CSG network;

*) has the user equipment position information such a global positioning system, GPS, data available or other location data provided by other means.

There may also be other factors included in, or contributing to or defining the confidence value e.g. an interference difference measurement.

Instead of a confidence factor, also an enumeration of conditions that are true may be sent from the user equipment to the network, NW, where the set of possible conditions may also be configured by the network and the network may be informed about supported conditions of each user equipment. This allows improving the algorithm improved over time and allows operator-specific and self-learning adjustment of the overall confidence calculation, as the final value will be determined in the network. Furthermore this allows vendor differentiation, as knowledge contained in the network (e.g. operation and maintenance or OAM system) and proprietary algorithms may be used to improve the result.

In a further embodiment, a list of conditions and the associated confidence factors can be configured by the network and downloaded to one, more or all user equipments which may then in turn report the applicable confidence factors.

The measurement report after re-acquisition of coverage of the preferred network or frequency may be combined with the confidence factor, and the discrimination of the confidence factor may be used to avoid unneeded SON re-arrangements, caused by terminals which are out of coverage, but not caused by a SON measure.

As mentioned already above, in accordance with one or more embodiments of the invention, a procedure or device comprises the feature that the network or a controller such as a network controller sets a confidence threshold. Only if the confidence value or confidence factor calculated at the user equipment is higher than the network-set confidence threshold, as detected by a comparison of the confidence threshold and the calculated confidence value or factor, the user equipment reports the coverage hole related measurement or detection, and optionally also the calculated confidence value, to the base station 2 or controller 3.

For example a confidence threshold and the confidence value can be defined to be e.g. a real value between 0 and 1, without loss of generality. Then in case the network sets the confidence threshold to a specific value such as being equal to 1, no coverage related measurements are done. The terminal may detect this specific threshold value and recognize that no coverage related measurements are to be carried out. This may also be the default assumption at the user equipment, so if then no signalling on BCH regarding confidence threshold is received, coverage hole related measurements are completely switched off (as a calculated confidence value would e.g. always be lower than 1, resulting in not sending any coverage hole detection signals). This network-defined setting of the confidence threshold allow an effective network control of switching on or off coverage hole detection processes. For legacy eNBs and advanced terminals this feature also supports compatibility in the sense that terminals do not report or utilize any advanced SON measurements which anyhow would not be applied since legacy eNBs do not support SON power saving features.

In accordance with one or more other embodiments, the confidence value/factor may be distinguished or calculated dependent on how confident individual parameters are. As an example, when the positioning information of the user equipment that is performing the measurement is available, the following rule for calculation may be applied:

If the UE has GPS data available,
Confidence factor for the location information is set close to 1, i.e. high (the exact position where coverage hole is located, is known and therefore this measurement report is very valuable for the system).

Else if the user equipment does not have GPS data available and the user equipment is registered at a network, e.g. a home network such as CSG home network (HeNB), and detects wide area, WA, coverage hole (thus, no suitable WA cell can be detected),
confidence factor for the location information is set high (purpose is to detect WA coverage holes for WA UEs which are near this HeNB but can not access since they do not have access permission due to closed subscriber group settings).

Else if the user equipment does not have GPS data available and the user equipment was registered at a WA eNB shortly before doing coverage hole detection,
confidence factor is set dependent on downlink transmission power of that WA cell which is included in BCH information and dependent on time between being registered at WA eNB and the event of coverage hole detection and is set lower than 1.

Further the higher the downlink transmission power of the WA cell and the higher the time between event of coverage hole detection and being registered at WA eNB, the lower the confidence factor calculated by the user equipment.

Note: If downlink, DL, transmission power of a cell is high, and the position of the user equipment which is registered to this WA cell is not known very well, and further if time between registration to a WA cell and outage occurrence is very long, the location of user equipment where coverage hole detection appeared is further very unsure.

Furthermore the user equipment feedback may, in accordance with one or more embodiments, distinguish between confidence in reason (i.e. probability that the root cause of the radio link failure, RLF, or inter-RAT, radio access technology, handover was a coverage hole) and confidence in location (spatial accuracy) of the information provided.

In accordance with one or more embodiments of the invention, the confidence factor can be arranged in classes, like low, medium, and high, or may be represented by a normalised measure, e.g. ranging between 0 and 1 as already described above.

In addition to the embodiments described above, a further example embodiment is given in the following for a range between 0 . . . 1 and using three inputs to derive the confidence factor:

| Confidence factor | Serving cell lost | SON Indicator broadcasted | Suitable neighbour cell(s) lost |
|---|---|---|---|
| 0.6 | yes | no | no |
| 1 | yes | yes | no |
| 0.1 | yes | no | yes |
| 0.3 | yes | yes | yes |

In this example, in case the serving cell is lost, the confidence factor is set or calculated depending whether or not a SON indicator has been broadcasted and whether or not one or more suitable neighbouring cells have been lost, too. As an example, in case the serving cell is lost, no SON indicator has been broadcasted and no suitable neighbouring cells have been lost, the confidence factor is set e.g. to 0.6. If the serving cell is lost, no SON indicator has been broadcasted and suitable neighbouring cells have been lost, too, the confidence factor is set e.g. to 0.1. If the serving cell is lost, a SON indicator has been broadcasted and suitable neighbouring cells have been lost, too, the confidence factor is set e.g. to 0.3. If the serving cell is lost, a SON indicator has been broadcasted and suitable neighbouring cells have not been lost, the confidence factor is set e.g. to 1.

As previously described the confidence can be additionally weighted by a location confidence factor which delivers a confidence about the location of the event, the terminal lost coverage and the moment it re-acquired the coverage. As stated before, presence of satellite based location determination will deliver high confidence values.

Figure 7:
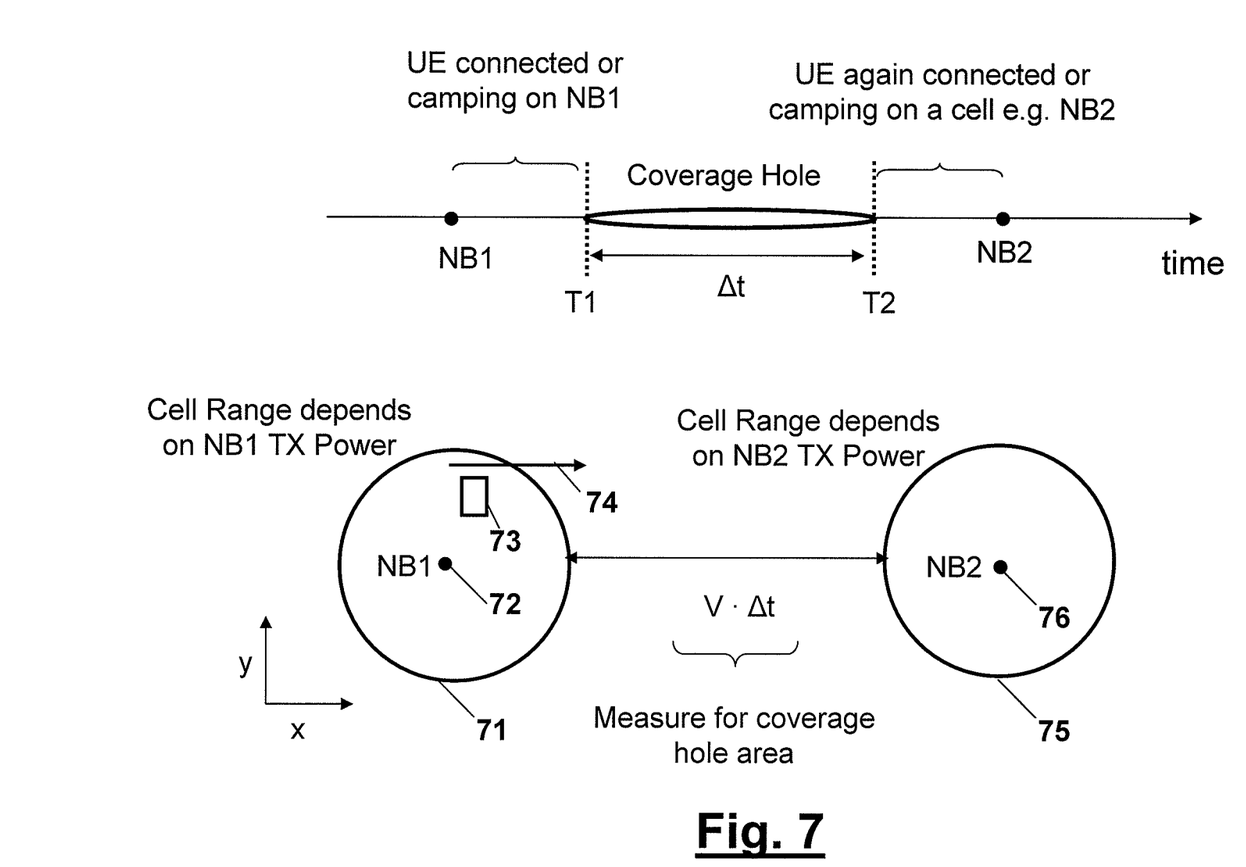
FIG. 7 illustrates a time diagram of connections or attachments of a user equipment.

In accordance with one or more embodiments of the invention, an implementation as shown in FIG. 7 and described below will do the same, possibly but not necessarily with limited confidence, based on the variation of parameters, without needing the means of satellite reception.

In the example embodiment of FIG. 7, a user equipment 73 such as a terminal or mobile station moves in the direction of an arrow 74 from a cell 71 defined by a base station or NodeB 72, NB1, to a cell 75 defined by a base station or NodeB 76, NB. The cell range of cell 71 depends on the transmit power, TX Power, of base station, NB1, 72. In a similar manner, the cell range of cell 75 depends on the transmit power, TX Power, of base station, NB2, 76.

In FIG. 7, time marks with t represent time ranges, whereas T stands for Time stamps or time points.

Up to time point T1, the user equipment 73 is connected to or camping on cell 71 and base station 72. In the time interval Δt between time points T1 and T2 the user equipment 73 is not connected to any base station or NB. Therefore, between T1 and T2, the user equipment 73 experiences and detects a coverage hole. At time point T2, the user equipment 73 is again connected to, or camping on, but now to or on base station, NB2, 76.

The velocity or moving speed V of the user equipment 73 and the time length of the time interval Δt, V·Δt, provides a measure for the coverage hole area.

Applying an algorithm based on the formula s=v*Δt and Δt=T2-T1 and considering the NB TX maximum power setting the location and size of the uncovered spot can be determined within a certain accuracy. The velocity v may be directly measured, or an estimated guess may be applied for the velocity v, taking e.g. a worst case for the scenario. The time stamps T1 and T2 produce an absolute information of a time, which may be derived from the real time, e.g. a direct time measurement using e.g. a clock module of the user equipment 73, or from an equivalent like frame numbering, e.g. based on the frame numbers difference between losing coverage at T1 and regaining coverage at T2.

If the TX power of the NB1 is low, the location of the user equipment UE at T1 can be well determined. The same applies for NB2 and T2. Assuming that NB1 and NB2 are different sites, and T1 and T2 are relatively small, the possibly uncovered area can be determined reasonably well in terms of location coordinates.

The terminal 1 may report the base station identity, BS ID, from NB 1 and NB 2, and T1 and T2 or equivalent Δt. An algorithm in the NodeB 72 or 76 or in another device then can calculate the geographical inaccuracy of the uncovered spot based on an estimation of the UE velocity v and on the known BS TX power setting, the known BS location (this can be retrieved from a database for each base station ID), applying the time stamp values.

The signalling of the confidence factor may e.g. be standardized as part of the air interface protocol. Embodiments may be used with or applied to e.g. existing or future LTE Node B, 3GPP radio access networks, RAN. Embodiments can be used to improve SON functionality.

Embodiments of the invention are applicable to any type of network technologies such as frequency division multiplex, FDD, and/or time division multiple, TDD, technologies and other technologies, and can be applied to LTE networks and all other kinds of mobile networks. In addition, embodiments of the invention may be base stations or sectors which may be switched off by SON procedures, for the sake of energy efficiency. Embodiments provide the advantage that efficient network operation is possible without degrading network service reliability, which otherwise might have negative consequences in call reliability. Embodiments of the invention therefore comprise a signalling procedure based on a confidence value, to improve decisions to re-activate a base station or NodeB so as to improve coverage only when truly needed.

For the purpose of the present invention as described herein above, it should be noted that any access or network technology may be used which may be any technology by means of which a user equipment can access a network. The network may be any device, unit or means by which a mobile or stationary entity or other user equipment may connect to and/or utilize services offered by the network. Such services may include, among others, data and/or (audio-) visual communication, data download etc.

Generally, the present invention is also applicable in those network/terminal environments relying on a data packet based transmission scheme according to which data are transmitted in data packets and which are for example based on the Internet Protocol IP. The present invention is, however, not limited thereto, and any other present or future IP or mobile IP version, or, more generally, a protocol following similar principles is also applicable. The user equipment entity may be any device, unit or means by which a system user may experience services from a network.

The sequence of method steps described above or shown in the drawings can be implemented in any other sequence arbitrarily deviating from the above described or shown sequence of steps. Further, the method, apparatuses and devices, may include only one, more or all of the features described above or shown in the drawings, in any arbitrary combination. The method steps may be implemented as software code portions and be run using a processor at a network element or terminal, can be software code independent, or can be specified using any known or future developed programming language as long as the functionality defined by the method steps is preserved. Generally, any method step is suitable to be implemented as software or by hardware without changing the idea of the present invention in terms of the functionality implemented. Devices, apparatus, units, or means, and/or method steps may be implemented as hardware components of a stationary or mobile station, or a terminal, or a network element, or part, or chipset, or module thereof, which part, or chipset, or module e.g. be used for an apparatus; may be hardware independent; and may be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. Devices, apparatus, units or means (e.g. User equipment, CSCF) can be implemented as individual devices, units, means, chipsets, modules, or part of devices, and may also be implemented in a distributed fashion throughout a system, as long as the functionality of the device, unit or means is preserved.

The invention claimed is:

1. An apparatus comprising:
   one or more processors; and
   one or more memories including computer program code, the one or more memories and the computer program code configured, with the one or more processors, to cause the apparatus to perform the following:
   detect a radio coverage hole;
   determine confidence information for a detection of the radio coverage hole, said confidence information being a confidence value indicating the reliability of the detection of the radio coverage hole, said confidence value being based at least in part on whether the apparatus has lost radio coverage in a serving cell for the apparatus and in a neighboring cell to the serving cell; and
   provide the detection of the radio coverage hole and the confidence information to a network.

2. The apparatus according to claim 1, wherein the one or more memories and the computer program code are further configured, with the one or more processors, to report at least one detected radio coverage hole, after re-acquisition of a connection to an access network.

3. The apparatus according to claim 2, wherein the confidence information is reported with the at least one detected radio coverage hole.

4. The apparatus according to claim 1, wherein the one or more memories and the computer program code are further configured, with the one or more processors, to perform at least one of:
   report at least one of an identity of a last cell to which it was attached, a location of the apparatus, a time stamp, and at least one confidence value for one or more other parameters,
   send at least one confidence information, and
   send one or more indications of conditions to a network.

5. The apparatus according to claim 4, wherein the at least one confidence information is a confidence estimation value after a radio link failure or after a handover event.

6. The apparatus according to claim 5, wherein the handover is from a non-preferred network or frequency to a preferred network or preferred frequency in a case the non-preferred network or frequency was chosen due to the fact that no cell, network or frequency of the preferred type had been available.

7. The apparatus according to claim 1, wherein the one or more memories and the computer program code are further configured, with the one or more processors, to perform at least one of:
   receive a confidence threshold from another apparatus or an access network,
   store a received or preset confidence threshold,
   compare the confidence information with the received or stored confidence threshold, and
   decide on reporting or not reporting a detected radio coverage hole depending on the comparison result,
   receive a confidence reporting threshold and/or one or more confidence-improving factors,
   a confidence improving factor or parameter indicating knowledge how far self-organizing network, SON, procedures are activated, and
   a confidence improving factor or parameter indicating that cells are disabled by a self-organizing network, SON, measure.

8. The apparatus according to claim 7, wherein the confidence improving factor or parameter also identifies the cells disabled by a self-organizing network, SON, measure.

9. The apparatus according to claim 1, wherein the one or more memories and the computer program code are further configured, with the one or more processors, to perform at least one of:
   decide on the confidence information based on:
   when the mobile station had beside the serving cell, at least one or more also acceptable cells, and within a short time period, all of the serving cell and acceptable cells are disappearing, such a situation is evaluated as a zero or low confidence information; and
   the confidence information being determined based on one or more, in any arbitrary combination, of the following or other parameters:
   whether a network indicator indicating or self-organizing network has been received;
   whether the serving cell was lost;
   whether there was a handover from a non-preferred network or frequency which had been chosen earlier due to the fact that no cells of the preferred type were available;
   whether one or more suitable neighbour cells have disappeared in close timing relationship with the disappearance of the serving cell;
   whether a closed subscription groups, CSG, network or a radio access has appeared or disappeared;

whether the user equipment is registered to a closed subscription groups network;
whether user equipment position information is provided by other means,
whether the confidence information is set dependent on downlink transmission power of a cell, and
whether the confidence information is set dependent on whether or not position information of the apparatus is available.

10. The apparatus according to claim 9, wherein the radio access is a home NodeB or evolved home NodeB, HeNB.

11. The apparatus according to claim 9, wherein user equipment position information is global positioning system, GPS, data or other location data.

12. The apparatus according to claim 1, wherein at least one of the confidence information and a confidence threshold is defined to be a real value of a certain range, and
when the confidence threshold is set to, or received having, a specific value, the apparatus is configured to carry out no coverage related measurements, and
when no confidence threshold is received, coverage hole related measurements are switched off.

13. The apparatus according to claim 1, wherein the apparatus is at least one of a terminal, mobile station, user equipment, a part of a terminal, a part of a mobile station, a part of a user equipment, a module, a chipset, a circuitry, or a software product embodied on a non-transitory computer-readable storage medium.

14. An apparatus comprising:
one or more processors; and
one or more memories including computer program code, the one or more memories and the computer program code configured, with the one or more processors, to cause the apparatus to perform the following:
receive a coverage hole detection signal and confidence information associated therewith, said confidence information being a confidence value indicating the reliability of the coverage hole detection, said confidence value being based at least in part on whether a second apparatus has lost radio coverage in a serving cell for the second apparatus and in a neighboring cell to the serving cell;
evaluate the received confidence information; and
decide on a potential coverage hole reducing or closing process depending on the evaluation.

15. The apparatus according to claim 14, wherein the one or more memories and the computer program code are further configured, with the one or more processors, to perform at least one of:
determine whether a coverage hole is present and/or remedy measures are to be taken, based on at least one criterion,
send a confidence reporting threshold and/or one or more confidence-improving factors,
a confidence improving factor or parameter indicating knowledge how far self-organizing network, SON, procedures are activated, and
a confidence improving factor or parameter indicating that cells are disabled by a self-organizing network, SON, measure.

16. The apparatus according to claim 15, wherein the at least one criterion is heuristics, a number of users providing a coverage hole report in a similar location.

17. The apparatus according to claim 15, wherein the confidence improving factor or parameter also identifies the cells disabled by a self-organizing network, SON, measure.

18. The apparatus according to claim 14, wherein the apparatus is a controller or part of a controller, a network, a module, a chipset, a circuitry, or a software product embodied on a non-transitory computer-readable storage medium.

19. The apparatus according to claim 14, wherein the potential coverage hole reducing or closing process comprises a switching-on of a switched-off base station, or increasing a transmit power level or changing a coverage area of one or more active base stations.

20. A system comprising:
at least one apparatus according to claim 1, and
at least one apparatus comprising:
one or more processors; and
one or more memories including computer program code, the one or more memories and the computer program code configured, with the one or more processors, to cause the apparatus to perform the following:
receive a coverage hole detection signal and confidence information associated therewith, said confidence information being a confidence value indicating the reliability of the coverage hole detection, said confidence value being based at least in part on whether a second apparatus has lost radio coverage in a serving cell for the second apparatus and in a neighboring cell to the serving cell;
evaluate the received confidence information; and
decide on a potential coverage hole reducing or closing process depending on the evaluation.

21. The system according to claim 20, wherein the potential coverage hole reducing or closing process comprises a switching-on of a switched-off base station, or increasing a transmit power level or changing a coverage area of one or more active base stations.

22. A method comprising:
detecting a radio coverage hole;
determining confidence information for a detection of the radio coverage hole, said confidence information being a confidence value indicating the reliability of the detection of the radio coverage hole, said confidence value being based at least in part on whether an apparatus has lost radio coverage in a serving cell for the apparatus and in a neighboring cell to the serving cell; and
providing the detection of the radio coverage hole and the confidence information to a network.

23. The method according to claim 22, further comprising:
reporting at least one detected radio coverage hole, after re-acquisition of a connection to an access network.

24. The method according to claim 23, wherein the confidence information is reported with the at least one detected radio coverage hole.

25. The method according to claim 22, further comprising at least one of the following:
reporting at least one of an identity of a last cell to which it was attached, a location of the apparatus, a time stamp, and at least one confidence value for one or more other parameters,
sending at least one confidence information, and
sending one or more indications of conditions to a network.

26. The method according to claim 25, wherein the at least one confidence information is a confidence estimation value after a radio link failure or after a handover event.

27. The method according to claim 26, wherein the handover is from a non-preferred network or frequency to a preferred network or preferred frequency in a case the non-preferred network or frequency was chosen due to the fact that no cell, network or frequency of the preferred type had been available.

28. The method according to claim 22, further comprising at least one of:

receiving a confidence threshold from another apparatus or an access network, storing a received or preset confidence threshold, comparing the confidence information with the received or stored confidence threshold, and deciding on reporting or not reporting a detected radio coverage hole depending on the comparison result, receiving a confidence reporting threshold and/or one or more confidence-improving factors, a confidence improving factor or parameter indicating knowledge how far self-organizing network, SON, procedures are activated, and a confidence improving factor or parameter indicating that cells are disabled by a self-organizing network, SON, measure.

29. The method according to claim 28, wherein the confidence improving factor or parameter also identifies the cells disabled by a self-organizing network, SON, measure.

30. The method according to claim 22, further comprising at least one of:

deciding on the confidence information based on:

when the mobile station had beside the serving cell, at least one or more also acceptable cells, and within a short time period, all of the serving cell and acceptable cells are disappearing, evaluating such a situation as a zero or low confidence information; and determining the confidence information based on one or more, in any arbitrary combination, of the following or other parameters:

whether a network indicator indicating or self-organizing network has been received;

whether the serving cell was lost;

whether there was a handover from a non-preferred network or frequency which had been chosen earlier due to the fact that no cells of the preferred type were available;

whether one or more suitable neighbour cells have disappeared in close timing relationship with the disappearance of the serving cell;

whether a closed subscription groups, CSG, network or a radio access has appeared or disappeared;

whether the user equipment is registered to a closed subscription groups network;

whether user equipment position information is provided by other means, whether the confidence information is set dependent on downlink transmission power of a cell, and whether the confidence information is set dependent on whether or not position information of the apparatus is available.

31. The method according to claim 30, wherein the radio access is a home NodeB or evolved home NodeB, HeNB.

32. The method according to claim 30, wherein user equipment position information is global positioning system, GPS, data or other location data.

33. The method according to claim 22, wherein at least one of the confidence information and a confidence threshold is defined to be a real value of a certain range, and when the confidence threshold is set to, or received having, a specific value, no coverage related measurements are carried out, and when no confidence threshold is received, coverage hole related measurements are switched off.

34. The method according to claim 22, wherein the method is carried out in at least one of a terminal, mobile station, user equipment, a part of a terminal, a part of a mobile station, a part of a user equipment, a module, a chipset, a circuitry, or a software product embodied on a non-transitory computer-readable storage medium.

35. A method comprising:

receiving a coverage hole detection signal and confidence information associated therewith, said confidence information being a confidence value indicating the reliability of the coverage hole detection, said confidence value being based at least in part on whether an apparatus has lost radio coverage in a serving cell for the apparatus and in a neighboring cell to the serving cell;

evaluating the received confidence information; and deciding on a potential coverage hole reducing or closing process depending on the evaluation.

36. The method according to claim 35, comprising at least one of:

determining whether a coverage hole is present and/or remedy measures are to be taken, based on at least one criterion, sending a confidence reporting threshold and/or one or more confidence-improving factors, a confidence improving factor or parameter indicating knowledge how far self-organizing network, SON, procedures are activated, and a confidence improving factor or parameter indicating that cells are disabled by a self-organizing network, SON, measure.

37. The method according to claim 36, wherein the at least one criterion is heuristics, a number of users providing a coverage hole report in a similar location.

38. The method according to claim 36, wherein the confidence improving factor or parameter also identifies the cells disabled by a self-organizing network, SON, measure.

39. The method according to claim 35, wherein the method is carried out in a controller or part of a controller, a network, a module, a chipset, a circuitry, or a software product embodied on a non-transitory computer-readable storage medium.

40. The method according to claim 35, wherein the potential coverage hole reducing or closing process comprises a switching-on of a switched-off base station, or increasing a transmit power level or changing a coverage area of one or more active base stations.

41. A computer program product comprising a non-transitory computer-readable storage medium bearing computer program code embodied therein for use with a computer, the computer program code comprising code for performing the method according to claim 22.

* * * * *